(12) United States Patent  (10) Patent No.: US 7,554,068 B2
Irikiin et al.  (45) Date of Patent: Jun. 30, 2009

(54) HEAT RADIATING STRUCTURE FOR SOLID-STATE IMAGE SENSOR, AND SOLID-STATE IMAGE PICKUP DEVICE

(75) Inventors: Miyoko Irikiin, Hyogo (JP); Yukihiro Iwata, Osaka (JP); Shinya Ogasawara, Hyogo (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 12/028,109

(22) Filed: Feb. 8, 2008

(65) Prior Publication Data

US 2008/0191124 A1   Aug. 14, 2008

(30) Foreign Application Priority Data

Feb. 9, 2007   (JP)   ............................. 2007-030212
Aug. 8, 2007   (JP)   ............................. 2007-206496

(51) Int. Cl.
*H01L 27/00*   (2006.01)
(52) U.S. Cl. .................... 250/208.1; 250/239
(58) Field of Classification Search ............. 250/208.1, 250/239, 238; 165/104.11, 104.33; 361/679.54, 361/709; 348/335–340; 257/276
See application file for complete search history.

(56) References Cited

U.S. PATENT DOCUMENTS 5,332,031 A * 7/1994 Kiga .......................... 165/86

FOREIGN PATENT DOCUMENTS

| JP | 1-295575 | 11/1989 |
|---|---|---|
| JP | 5-292366 | 11/1993 |
| JP | 7-66579 | 3/1995 |
| JP | 8-17980 | 1/1996 |
| JP | 8-288676 | 11/1996 |
| JP | 11-122516 | 4/1999 |
| JP | 2911441 | 6/1999 |
| JP | 2001-42435 | 2/2001 |
| JP | 2001-308569 | 11/2001 |
| JP | 2002-206881 | 7/2002 |
| JP | 2002-247594 | 8/2002 |
| JP | 3459468 | 8/2003 |
| JP | 2007-174526 | 7/2007 |

* cited by examiner

*Primary Examiner*—Que T Le
(74) *Attorney, Agent, or Firm*—Wenderoth, Lind & Ponack, L.L.P.

(57) ABSTRACT

In a heat radiating member which has a contact portion to be put into contact with a solid-state image sensor fixed to a prism member, and a fin-like heat radiating portion for radiating heat, which has been transferred through the contact portion, into its surrounding gas, the contact portion and the heat radiating portion are formed from a foil member made of a high heat conductivity material. By mounting the heat radiating member on the solid-state image sensor, there is realized a heat radiating structure for cooling the solid-state image sensor while reducing external-force loads applied to the solid-state image sensor with a relatively simple structure.

20 Claims, 12 Drawing Sheets

HEAT RADIATING STRUCTURE FOR SOLID-STATE IMAGE SENSOR, AND SOLID-STATE IMAGE PICKUP DEVICE

BACKGROUND OF THE INVENTION

1. Field of the Invention

The present invention relates to a heat radiating structure for solid-state image sensors to be used for image pickup devices such as television cameras and video cameras including solid-state image sensors, as well as to a solid-state image pickup device having such a heat radiating structure.

2. Description of Related Art

In recent years, there have been developed, and now in widespread use, 3CCD color cameras (hereinafter, referred to as 3CCD cameras) as an image pickup device using three solid-state image sensors. The structure of such a conventional 3CCD camera is explained below with reference to the accompanying drawings.

FIG. 1 is a schematic sectional view of an image pickup block 10 in a conventional 3CCD camera. As shown in FIG. 1, the image pickup block 10 includes a color separation prism for separating incident light, which has come up through an unshown image pickup lens of the 3CCD camera, into color components, a plurality of solid-state image sensors, and image sensor boards on which the solid-state image sensors are mounted, respectively.

As shown in FIG. 1, the color separation prism is made up of three prism members $1r$, $1g$, $1b$, which are joined together in close contact with one another. The color separation prism constructed like this is a three color separation prism 1 for separating incident light into three color components. Junction interfaces among the prism members $1r$, $1g$, $1b$ serve as dichroic mirrors 4, 5. On light-outgoing surfaces of the three prism members $1r$, $1g$, $1b$, solid-state image sensors $2r$, $2g$, $2b$ are fixed individually with adhesive.

Referring to FIG. 1, a light beam 7 incident on the three color separation prism 1 is separated by the dichroic mirrors 4, 5 into three color components, i.e. light beams $6a$, $6b$, $6c$ of three primary colors of light, and the resultant light beams are received by their corresponding solid-state image sensors $2r$, $2g$, $2b$, respectively. Out of the light beams separated into the three primary colors and reflected by the dichroic mirrors 4, 5, the light beams $6a$, $6b$ are totally reflected again within the prism members $1g$, $1b$, respectively, thereby being received by the solid-state image sensors $2g$, $2b$ as light beams that form not mirror images (reflected images) but non-mirror images. Image pickup signal processing for the individual light beams received by the solid-state image sensors $2g$, $2b$, $2r$, respectively, is performed by the image sensor boards $3r$, $3g$, $3b$, respectively, so that a color television signal into which the image pickup signals have been synthesized is obtained.

For the conventional 3CCD camera having such a structure described above, there is a need for achieving high-accuracy superimposition of three-color subject images. Poor accuracy of superimposition, i.e. poor accuracy of registration, would lead to occurrence of color differences or moire false signals, resulting in a subtly deteriorated image. Accordingly, in order to prevent any deterioration of registration accuracy, there is a need for reducing external-force loads applied to the respective solid-state image sensors $2r$, $2g$, $2b$.

Further, a solid-state image sensor, if used under a high-temperature environment, would undergo occurrence of image quality deterioration due to white scratches, life reduction and so on, and therefore needs to be used at a specified temperature or lower. Particularly in recent years, in image pickup devices typified by 3CCD cameras on which solid-state image sensors are mounted, there is a tendency that the ambient temperature of the solid-state image sensors (i.e., internal temperature within the device casing) increases more and more with increasing power consumption that can be attributed to light, thin, short and small dimensions and more multiple and higher functions of the device, making it indispensable to provide a means for cooling the solid-state image sensors.

Therefore, in conventional image pickup devices, there have been proposed various heat radiating structures for efficiently cooling solid-state image sensors while reducing external-force loads applied to the solid-state image sensors (see, e.g., Document 1: Japanese patent application publication No. H1-295575, Document 2: Japanese patent application publication No. 2002-247594, and Document 3: Japanese patent application publication No. 2001-308569).

First, Document 1 proposes a heat radiating structure in which a thermoelectric cooling device mounted on a heat transfer member by screws is placed so as to be in contact with the back face of each solid-state image sensor. Document 1 says that, in such a heat radiating structure, since deformations due to thermal expansion and thermal contraction of each member can be absorbed by backlashes of the screws, forces due to the thermal deformations can be prevented from being applied from the cooling device to the solid-state image sensors.

Also, Document 2 proposes a heat radiating structure in which a thermoelectric cooling device fixed to a heat conducting plate is so placed as to be in close contact with the back faces of the solid-state image sensors with proper force by utilizing the elasticity of the heat conducting plate. Document 2 says that, in such a heat radiating structure, since the cooling device can be put into close contact with the back faces of the solid-state image sensors by utilizing the elasticity of the heat conducting plate, there can be realized an efficient heat radiation.

Document 3 proposes a heat radiating structure using no thermoelectric cooling device in which one end of a metallic component is inserted between the back face of a solid-state image sensor and the image sensor board while the other end of the metallic component is fixed to a metal frame so that heat transferred from the solid-state image sensor to the metallic component is released to the metal frame.

SUMMARY OF THE INVENTION

In recent years, the positioning of individual solid-state image sensors in such a 3CCD camera has been under a demand for accuracy on the order of μm. For example, the positioning of the individual solid-state image sensors $2r$, $2g$, $2b$, as it stands, has been coming to require accuracies on the order of several tens of μm for the positioning in the optical axis direction because of a depth of focus, and the order of μm for that of the in-plane direction of the subject image.

However, in the heat radiating structure of Document 1, since external forces are absorbed by the backlashes of the screws, external forces caused by small thermal deformations cannot be absorbed enough. Therefore, depending on the magnitude of an external force that acts on the solid-state image sensors, the external force may affect the positioning accuracy of those image sensors, giving rise to an issue of deterioration of registration accuracy due to positional shifts. Also, in the heat radiating structure of Document 2, since external forces are applied to the solid-state image sensors by elasticity of the heat conducting plate and the external forces vary depending on thermal expansion or the like, there are cases where the positioning accuracy is affected by the external forces. Furthermore, in the heat radiating structures of Documents 1 and 2, since relatively expensive thermoelectric cooling devices are used, the image pickup device increases in cost as a further issue.

Even in the heat radiating structure of Document 3 using no cooling device, since the metallic component having one end fixed to the metal frame is placed so as to be in contact with the back faces of the solid-state image sensors, loads due to springbacks caused by thermal expansion and contraction of the metallic member are applied to the solid-state image sensors through the contact end portions of the metallic member on the solid-state image sensor side. This results in occurrence of positional shifts at the bonding surfaces between the solid-state image sensors and the prism member, giving rise to an issue of deterioration of registration accuracy due to the positional shifts. Furthermore, any one of the heat radiating structures of Documents 1 to 3 is complicated in structure, being no simple to attach or handle.

Moreover, there has been widely used a technique of fixing bonding surfaces of the solid-state image sensors 2r, 2g, 2b, in which, with the use of UV adhesive (ultraviolet curable adhesive) for the bonding between front faces of the solid-state image sensors 2r, 2g, 2b and the prism members 1r, 1g, 1b, positioning (for six axes) for the solid-state image sensors 2r, 2g, 2b are performed after the adhesive is applied to between their bonding surfaces, and ultraviolet radiation is applied thereto to cure the adhesive and thereby fix the bonding surfaces.

However, since such UV adhesive has a high temperature creep property (a property of creeping due to continued application of loads under a high temperature environment), loads due to the springbacks of the metallic component and the like become a serious matter particularly as the ambient temperature of the solid-state image sensors 2r, 2g, 2b (i.e., internal temperature within the device casing) becomes higher.

Accordingly, an object of the present invention, lying in solving the above-described issues, is to provide a heat radiating structure of solid-state image sensors to be used for a solid-state image pickup device having those solid-state image sensors, the heat radiating structure of solid-state image sensors serving for cooling the solid-state image sensors while reducing any external-force loads applied to the solid-state image sensors with a simple structure, as well as to provide a solid-state image pickup device having such a heat radiating structure.

In order to achieve the above object, the present invention has the following constitutions.

According to a first aspect of the present invention, there is provided a heat radiating structure for solid-state image sensors, comprising:

a heat radiating member which has a contact portion to be put into contact with a solid-state image sensor fixed to a prism member, and a fin-like heat radiating portion for radiating heat into surrounding gas, the heat being transferred through the contact portion, wherein the contact portion and the heat radiating portion are formed from a foil member made of a high heat conductivity material.

According to a second aspect of the present invention, there is provided the heat radiating structure for solid-state image sensors as defined in the first aspect, wherein the contact portion of the heat radiating member is put into contact with the solid-state image sensor via a contact aid material.

According to a third aspect of the present invention, there is provided the heat radiating structure for solid-state image sensors as defined in the first aspect, wherein in the heat radiating member, the fin-like heat radiating portion is so shaped that the foil member is bent or folded in its thicknesswise direction.

According to a fourth aspect of the present invention, there is provided the heat radiating structure for solid-state image sensors as defined in the first aspect, wherein a plurality of the heat radiating members are in contact with a plurality of the solid-state image sensors, respectively and independently, which are fixed to a plurality of the prism members constituting a color separation prism for separating light into a plurality of color components.

According to a fifth aspect of the present invention, there is provided the heat radiating structure for solid-state image sensors as defined in the fourth aspect, wherein widthwise directions of the heat radiating members in the fin-like heat radiating portions are set along an identical direction among all the heat radiating members.

According to a sixth aspect of the present invention, there is provided the heat radiating structure for solid-state image sensors as defined in the first aspect, wherein the contact portion is placed so as to be in contact with a substantially entire surface of one face of the solid-state image sensor, and the fin-like heat radiating portion is formed from the foil member extending from mutually opposing end portions of the contact portion, respectively.

According to a seventh aspect of the present invention, there is provided the heat radiating structure for solid-state image sensors as defined in the first aspect, wherein the heat radiating member comprises first and second ones of the contact portions which are fixed to a plurality of the prism members, respectively and independently, and which are put into contact with mutually adjoining first and second ones of the solid-state image sensors, respectively and independently, and the heat radiating portion for radiating heat into surrounding gas, the heat being transferred through the first and second contact portions, wherein the heat radiating portion is placed between the first and second contact portions, the respective first and second contact portions and the heat radiating portion are formed by the foil member in continuation, respectively, and the heat radiating portion has such a fin-like shape that the foil member is folded or bent a plurality of times.

According to an eighth aspect of the present invention, there is provided the heat radiating structure for solid-state image sensors as defined in the seventh aspect, the heat radiating member further comprising:

a third contact portion which is to be put into contact with a third solid-state image sensor mutually adjoining the second solid-state image sensor; and another heat radiating portion placed between the second and third contact portions, for radiating heat into surrounding gas, the heat being transferred through the second and third contact portions, wherein the respective second and third contact portions and the another heat radiating portion are formed from a single-in-continuation foil member made of a high heat conductivity material.

According to a ninth aspect of the present invention, there is provided the heat radiating structure for solid-state image sensors as defined in the seventh aspect, wherein in the heat radiating portion, a plurality of cutout portions are formed along a direction perpendicular to a widthwise direction of the heat radiating member.

According to a tenth aspect of the present invention, there is provided the heat radiating structure for solid-state image sensors as defined in the ninth aspect, wherein the cutout portions are slits each having a width.

According to an eleventh aspect of the present invention, there is provided a solid-state image pickup device comprising:

a color separation prism made up of a plurality of prism members, for separating light into a plurality of color components;

a plurality of solid-state image sensors fixed to the plurality of prism members, respectively and independently; and a plurality of heat radiating members having contact portions to be put into contact with the solid-state image sensors, respectively and independently, and fin-like heat radiating portions for radiating heat into surrounding gas, the heat being transferred through the contact portions, wherein the contact portions and the heat radiating portions are formed from a foil member made of a high heat conductivity material.

According to a twelfth aspect of the present invention, there is provided the solid-state image pickup device as defined in the eleventh aspect, wherein widthwise directions of the heat radiating members in the fin-like heat radiating portions are set along an identical direction among all the heat radiating members.

According to a 13th aspect of the present invention, there is provided a solid-state image pickup device comprising:

a prism member;

a solid-state image sensor fixed to the prism member; and a heat radiating member which has a contact portion to be put into contact with the solid-state image sensor, and a fin-like heat radiating portion for radiating heat into its surrounding gas, the heat being transferred through the contact portion, wherein the contact portion and the heat radiating portion are formed from a foil member made of a high heat conductivity material.

According to a 14th aspect of the present invention, there is provided the solid-state image pickup device as defined in the 13th aspect, wherein the contact portion of the heat radiating member is put into contact with the solid-state image sensor via a contact aid material.

According to a 15th aspect of the present invention, there is provided the solid-state image pickup device as defined in the 13th aspect, wherein in the heat radiating member, the fin-like heat radiating portion is so shaped that the foil member is bent or folded in its thicknesswise direction.

According to a 16th aspect of the present invention, there is provided the solid-state image pickup device as defined in the 13th aspect, wherein the contact portion is placed so as to be in contact with a substantially entire surface of one face of the solid-state image sensor, and the fin-like heat radiating portion is formed from the foil member extending from mutually opposing end portions of the contact portion, respectively.

According to a 17th aspect of the present invention, there is provided the solid-state image pickup device as defined in the 13th aspect, comprising:

a color separation prism made up of a plurality of the prism members, for separating light into a plurality of color components; and a plurality of the solid-state image sensors fixed to the plurality of the prism members, respectively and independently, wherein the heat radiating member has first and second ones of the contact portions which are put into contact with mutually adjoining first and second ones out of the plurality of solid-state image sensors, respectively and independently, and the heat radiating portion for radiating heat into surrounding gas, the heat being transferred through the first and second contact portions, the heat radiating portion is placed between the first and second contact portions, and the respective first and second contact portions and the heat radiating portion are formed by the foil member in continuation, and the heat radiating portion has such a fin-like shape that the foil member is folded or bent a plurality of times.

According to a 18th aspect of the present invention, there is provided the solid-state image pickup device as defined in the 17th aspect, the heat radiating member further comprising:

a third contact portion which is to be put into contact with a third solid-state image sensor mutually adjoining the second solid-state image sensor; and another heat radiating portion placed between the second and first contact portions, for radiating heat into surrounding gas, the heat being transferred through the second and third contact portions, wherein the respective second and third contact portions and the another heat radiating portion are formed from a single-in-continuation foil member made of a high heat conductivity material.

According to a 19th aspect of the present invention, there is provided the solid-state image pickup device as defined in the 13th aspect, wherein in the heat radiating portion, a plurality of cutout portions are formed along a direction perpendicular to a widthwise direction of the heat radiating member.

According to a 20th aspect of the present invention, there is provided the solid-state image pickup device as defined in the 19th aspect, wherein the cutout portions are slits each having a width.

According to the present invention, there is adopted a structure in which the heat radiating member having a contact portion to be put into contact with solid-state image sensors, and a heat radiating portion having a fin-like shape or folded-in-plural-times shape or a bent-in-plural-times shape is not fixed to a casing or other member so that heat is radiated into the surrounding gas through the fin-like or other shaped heat radiating portion. That is, according to the present invention, there is not adopted a structure in which a heat radiating member is fixed to a casing or other member as in conventional heat radiating structures. As a result of this structure of the present invention, stress loads such as springbacks to be applied through the heat radiating member to the solid-state image sensors can be reduced to a remarkable extent. Further, although such a heat radiating member is placed so as to be in contact with the surfaces of the solid-state image sensors, the contact portion and the fin-like or other shaped heat radiating portion are both formed from a foil member, so that own weight of the heat radiating member can be reduced to such a limit that the member form can be maintained. Accordingly, stress loads applied to the solid-state image sensors due to the own weight of the heat radiating member can be suppressed. Consequently, stress loads applied to the solid-state image sensors through the heat radiating member can be reduced while necessary heat radiating performance is ensured, with a relatively simple structure. Thus, there can be provided a heat radiating structure for solid-state image sensors capable of suppressing deteriorations of the registration accuracy, as well as a solid-state image pickup device having such a heat radiating structure.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
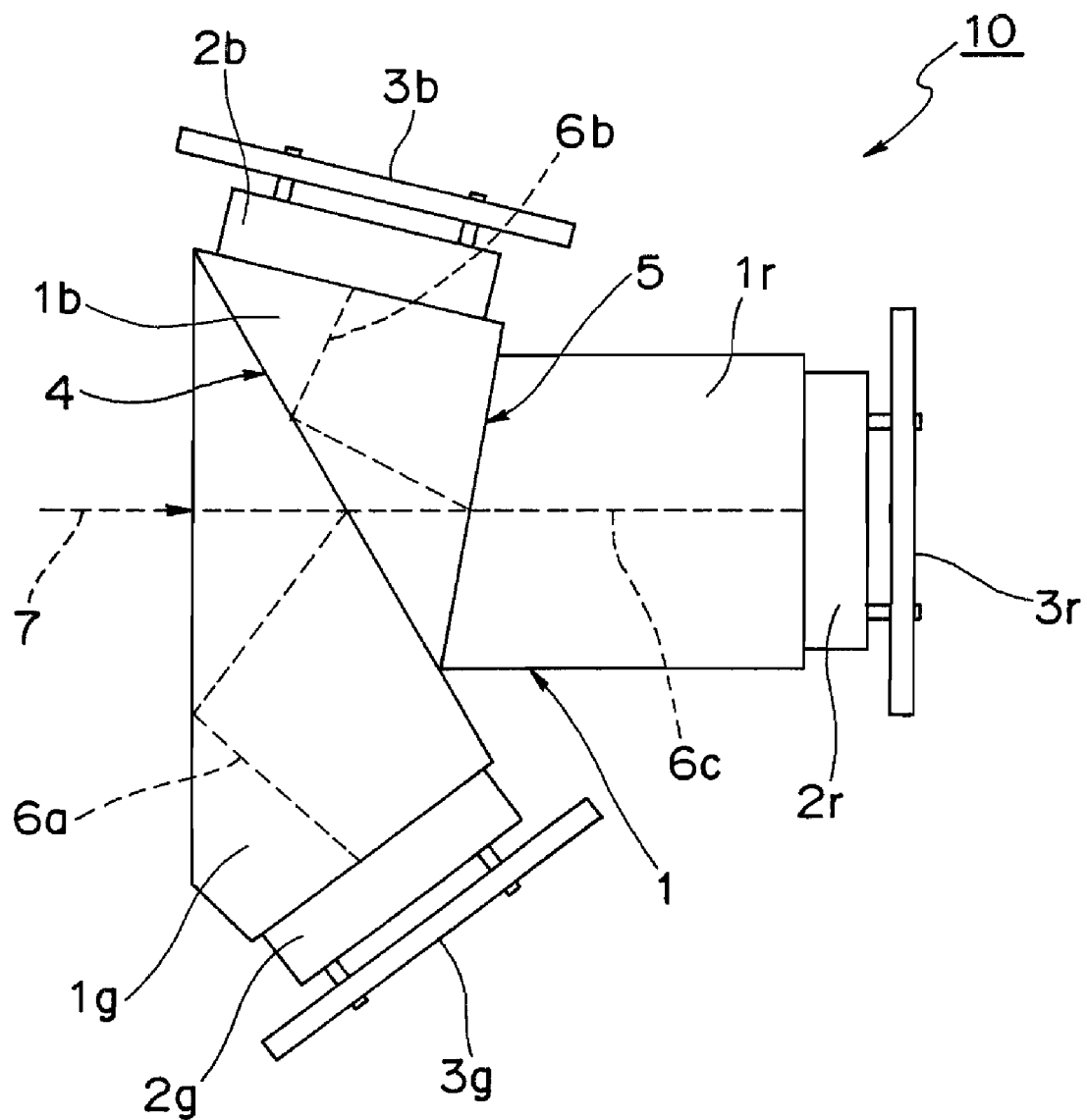
FIG. 1 is a schematic view of an image pickup block in a conventional 3CCD color camera.

Before the description of the present invention proceeds, it is to be noted that like parts are designated by like reference numerals throughout the accompanying drawings.

Hereinbelow, embodiments of the present invention will be described in detail with reference to the accompanying drawings.

First Embodiment

Figure 2:
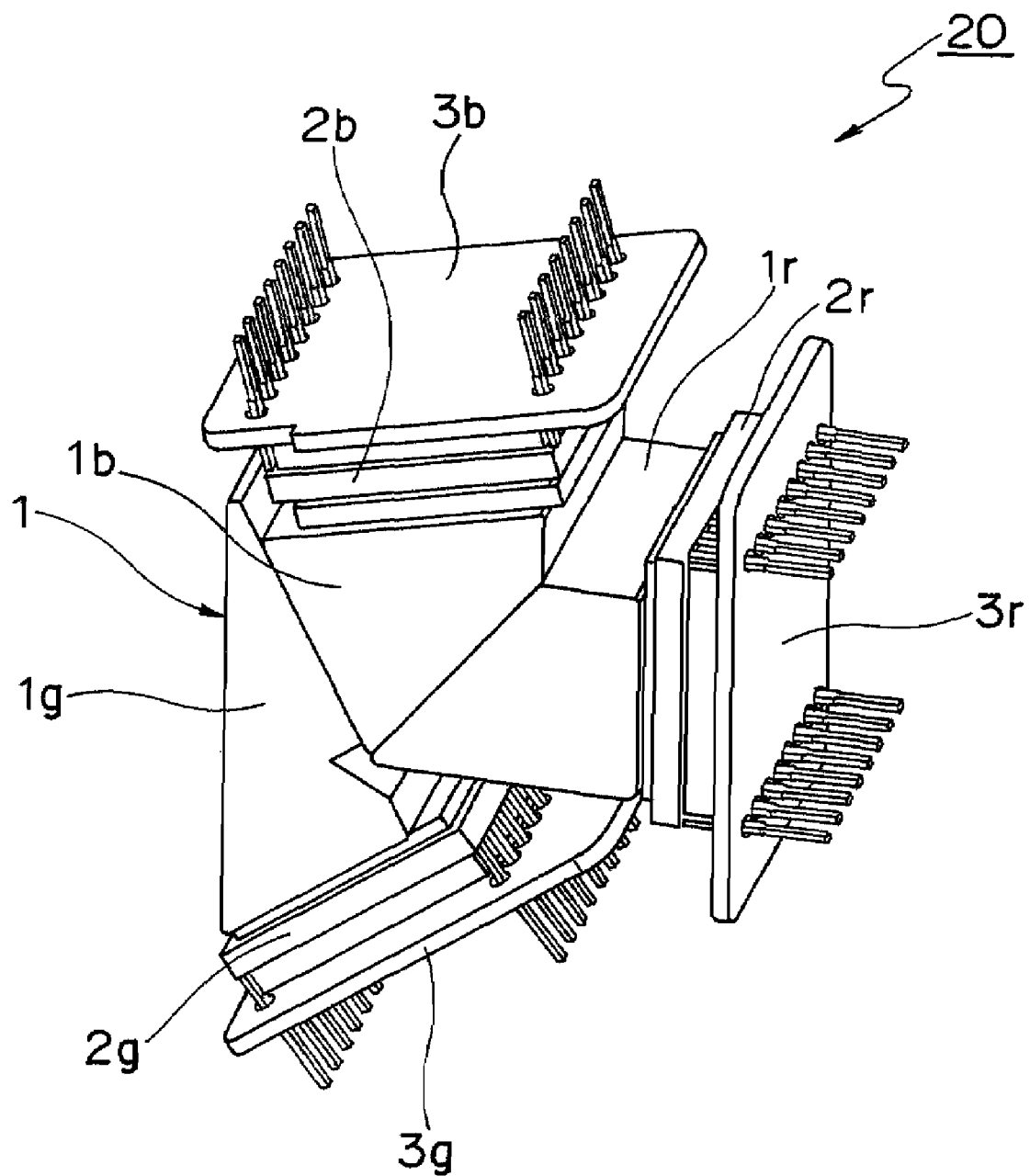
FIG. 2 is a schematic perspective view of an image pickup block which has not yet equipped with a heat radiating structure for solid-state image sensors according to a first embodiment of the invention.
Figure 3:
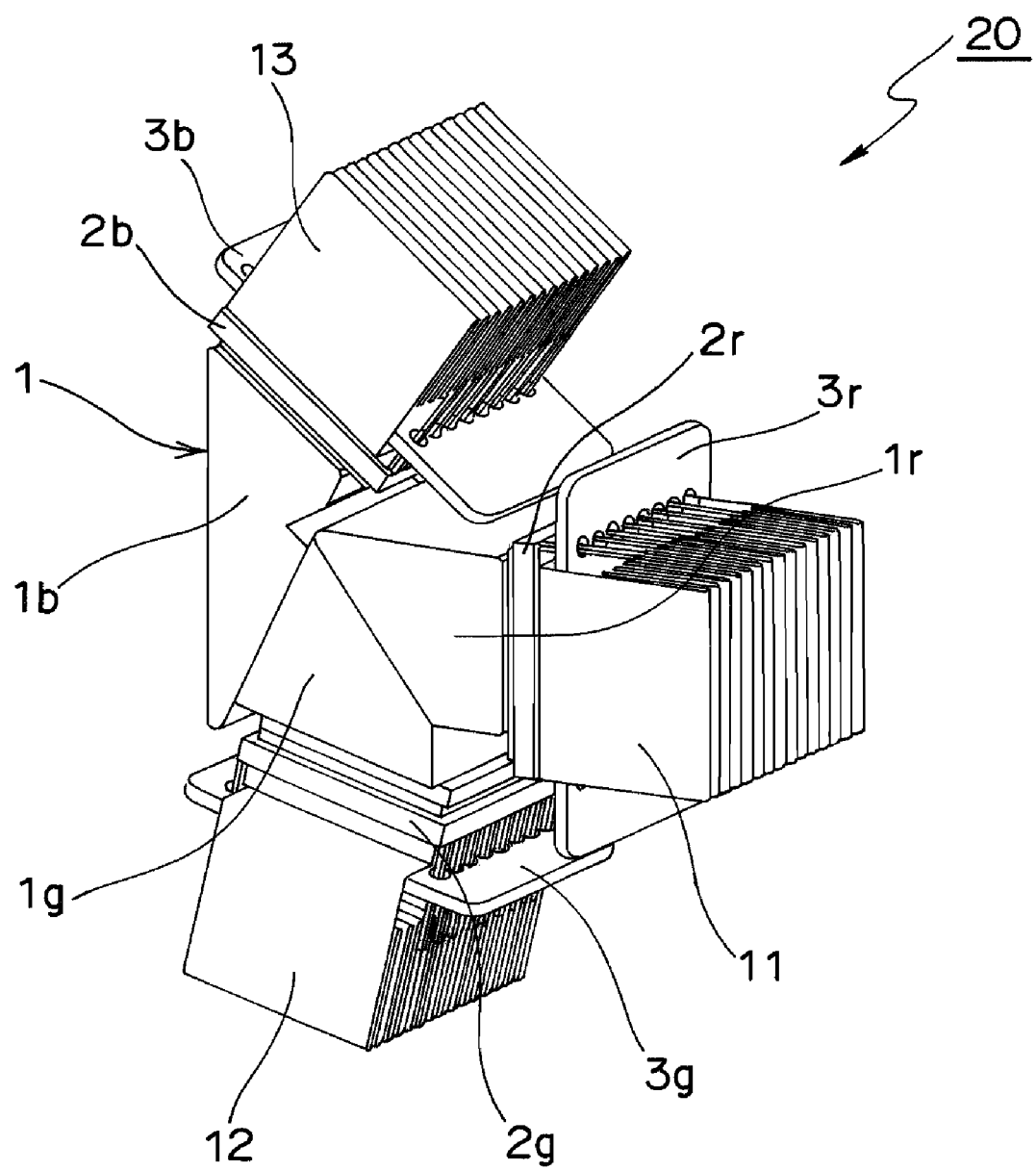
FIG. 3 is a schematic perspective view of the image pickup block of FIG. 2 that is equipped with the heat radiating structure of the first embodiment.

FIG. 2 shows a schematic perspective view of an image pickup block 20 in a 3CCD camera which adopts a heat radiating structure for solid-state image sensors according to a first embodiment of the invention (where the image pickup block 20 is not equipped with a heat radiating structure). FIG. 3 shows a schematic perspective view of the image pickup block 20 equipped with the heat radiating structure of the first embodiment. It is noted that the image pickup block 20 is similar in structure itself to the image pickup block 10 of FIG. 1, and so like component members are designated by like reference numerals and their description is omitted.

As shown in FIGS. 2 and 3, the heat radiating structure for solid-state image sensors of the first embodiment is so made up that fin-like heat radiating members (heat-radiating fin members) 11, 12, 13 implemented by foil members formed from high heat conductivity material are separately placed so as to be in contact with back faces of their corresponding solid-state image sensors 2r, 2g, 2b. Heat generated in the solid-state image sensors 2r, 2g, 2b is released into their surrounding gas, i.e. atmospheric air, through the individual heat radiating members 11, 12, 13 without interposition of any other member. As a result, temperatures of the individual solid-state image sensors 2r, 2g, 2b can be decreased.

Figure 4:
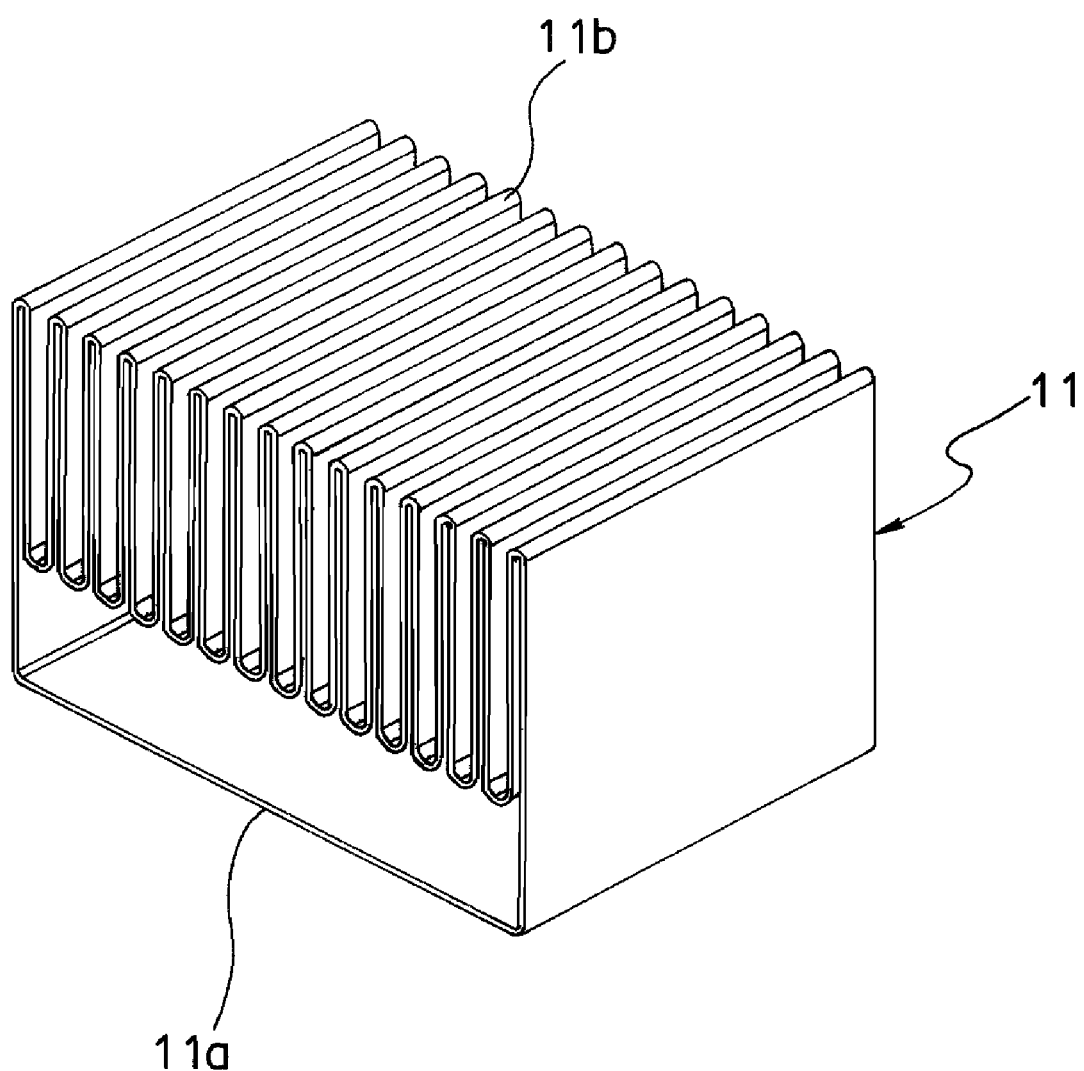
FIG. 4 is a schematic perspective view of a heat radiating member of the first embodiment.

FIG. 4 shows a schematic perspective view of an external structure of the heat radiating member 11 that typifies the heat radiating members 11, 12, 13 having an identical configuration.

As shown in FIG. 4, the heat radiating member 11 includes a contact portion 11a at its bottom portion as viewed in the figure, and a heat radiating portion 11b at its top portion. The contact portion 11a, when in contact with the back face of the solid-state image sensor 2r (i.e., a face of the solid-state image sensor opposite to its light-receiving face), transfers heat generated in the solid-state image sensor 2r to the heat radiating member 11 by the contact. The heat radiating portion 11b has a plurality of fins which are accordion-folded-like shaped so as to increase its contact area with the ambient atmosphere, i.e. the heat radiating area, by an arrangement that a foil member extending upward, as viewed in the figure, from mutually opposing end portions in the bottom portion is bent or folded a plurality of times in its thicknesswise direction.

In this heat radiating member 11, the contact portion 11a and the heat radiating portion 11b are formed by using a foil member having a specified width (e.g., one continued unit of foil member). For such a foil member, for example, copper or graphite sheet or the like is used as a high heat conductivity material (a material having a high thermal conductivity), and formed into a foil shape having a thickness of, for example, 0.1 mm or less.

In the heat radiating member 11 having such a structure as described above, as shown in FIG. 3, the contact portion 11a formed from the foil member is placed between the solid-state image sensor 2r and the image sensor board 3r, in which placement the bottom face of the contact portion 11a is set in contact with the back face of the solid-state image sensor 2r. In this connection, dimensions (length and width) of the contact portion 11a are so determined that the contact portion 11a is brought into contact with a generally entire flat portion of the back face of the solid-state image sensor 2r in order to ensure enough contact area to allow the heat generated in the solid-state image sensor 2r to escape effectively. Also, to enhance substantial contactability between the contact portion 11a of the heat radiating member 11 and the back face of the solid-state image sensor 2r, for example, grease or the like may be applied and placed to therebetween as a contact aid material. That is, in the invention, the contact between the solid-state image sensor and the heat radiating member includes both cases where the two members are in direct contact without intervention of any other member and where those are in indirect contact with intervention of a contact aid material typified by grease with the aim of improving the contactability between the solid-state image sensor and the heat radiating member.

Also, the contact portion 11a of the heat radiating member 11, which is placed between the solid-state image sensor 2r and the image sensor board 3r, is lightly sandwiched therebetween so that the heat radiating member 11 is held in its placement position. Instead, without being sandwiched by the two members, the heat radiating member 11 may be provided slidably movable to some degree of freedom while held contactable with the solid-state image sensor 2r. That is, as far as the contactability between the solid-state image sensor and the heat radiating member is kept, relative movement of the heat radiating member to the solid-state image sensor does not matter.

As shown in FIG. 3, the other heat radiating members 12, 13 as well are similar in structure to the heat radiating member 11 and so placed as to be in contact with the solid-state image sensors 2g, 2b, respectively. Further, in this first embodiment, in the state that the heat radiating members 11, 12, 13 are each mounted on the image pickup block 20 as shown above, the heat radiating members 11, 12, 13 are so placed as to be kept from contact with any other member such as other heat radiating member, casing, and lens barrel casing.

The heat radiating structure for solid-state image sensors according to the first embodiment adopts an arrangement in which the heat radiating members 11, 12, 13 are so placed as to be in contact with the back faces of the solid-state image sensors 2r, 2g, 2b, respectively, which are fixed to the prism members 1r, 1g, 1b, respectively, constituting the image pickup block 20, so that the accordion-folded-like heat radiating portions of the respective heat radiating members 11, 12, 13 serve to radiate heat into their ambient atmosphere. With such an arrangement, stress loads to be applied from the heat radiating members to the solid-state image sensors due to springbacks caused by thermal expansion and thermal contraction can be reduced remarkably, as compared to cases where heat radiating members are fixed to other members even in radiation-side end portions as in conventional heat radiating structures.

Further, by the makeup that the entire structure of such fin-like heat radiating members 11, 12, 13 including their contact portions and heat radiating portions is made up from a foil member formed of a high heat conductivity material having a thickness of 0.1 mm or less (e.g., an integrated-unit like makeup), own weights of the heat radiating members 11, 12, 13 can be reduced to a large extent. In particular, the fin-like heat radiating members of this first embodiment are formed from foil members with importance laid on lighter weight more than on minimization of the distance, unlike common heat-radiating fin members that adopt such a makeup that the distance between contact portion and heat radiating portion is minimized. More specifically, as shown in FIG. 4, the heat radiating members of this embodiment differ from common heat-radiating fin members largely in that a plurality of fins are accordion-folded-like shaped by the arrangement that a foil member having a specified width size is bent or folded a plurality of times. By the use of the heat radiating members whose own weights are reduced to a large extent as shown above, stress loads to be applied to the solid-state image sensors due to their own weights can be greatly reduced.

Thus, there can be provided a heat radiating structure for solid-state image sensors which is capable of reducing stress loads applied to the solid-state image sensors through the heat radiating members while ensuring necessary heat radiating performance with a relatively simple structure so that deteriorations of the registration accuracy can be suppressed.

Furthermore, by the arrangement that the contact portion 11a of the heat radiating member 11 is in contact with the back face of the solid-state image sensor 2r and that the heat radiating portion 11b is formed so as to extend from mutually opposing end portions of the contact portion 11a, heat generated in the solid-state image sensor can be transferred from those end portions to the heat radiating member and thus radiated. Thus, the heat radiating structure has higher heat radiation efficiency, compared with the case where the heat radiating portion extends from only one end portion, thus achieving an effect that the solid-state image sensors can be maintained uniform in temperature.

Figure 5:
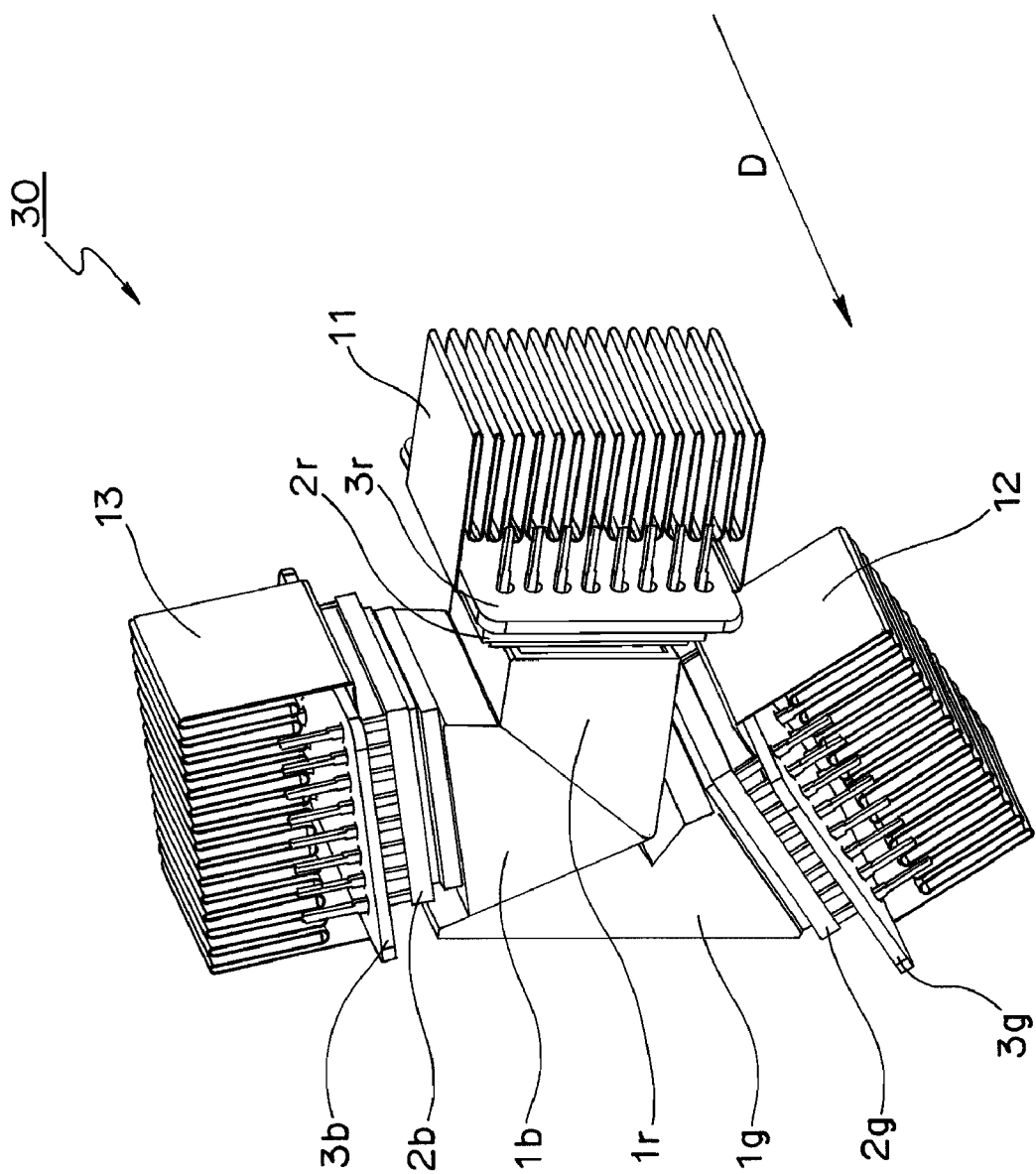
FIG. 5 is a schematic perspective view of an image pickup block equipped with a heat radiating structure according to a modification of the first embodiment.

FIG. 5 shows a schematic perspective view of an image pickup block 30 equipped with a heat radiating structure according to a modification of the first embodiment. In the image pickup block 30 shown in FIG. 5, individual image sensor boards 3r, 3g, 3b are fixed at placement positions rotated along their board surface directions by 90° with respect to the prism members 1r, 1g, 1b, respectively, compared with the image pickup block 20 as shown in FIG. 3. Further, in correspondence to those placement positions of the image sensor boards 3r, 3g, 3b, the heat radiating members 11, 12, 13 are also provided at placement positions rotated by 90°, respectively, compared with the image pickup block 20 as shown in FIG. 3. As a result, as shown in FIG. 5, the directions of the fins of the respective heat radiating portions of the heat radiating members 11, 12, 13 can be set along a coincident direction D. In other words, the widthwise directions of the heat radiating members can be set along the coincident direction D. As a result of this, gas flow directions D in the fins of the heat radiating portions of the heat radiating members 11, 12, 13 can be made coincident with one another.

By the arrangement that all the heat radiating members 11, 12, 13 have the same gas flow direction D of the heat radiating portion, the heat radiating efficiency can be improved by positively utilizing the convection of surrounding air, for example, by placing the image pickup block 30 so that the direction D is a vertical direction. Besides, a uniform heat radiation effect can be obtained in all the heat radiating members 11, 12, 13. Moreover, even if the direction D is not set along the vertical direction, the heat radiating efficiency can be improved by mechanically forming an air flow along the direction D with a blower or the like, in which case a uniform heat radiation effect can also be obtained in all the heat radiating members 11, 12, 13.

Second Embodiment

Figure 6:
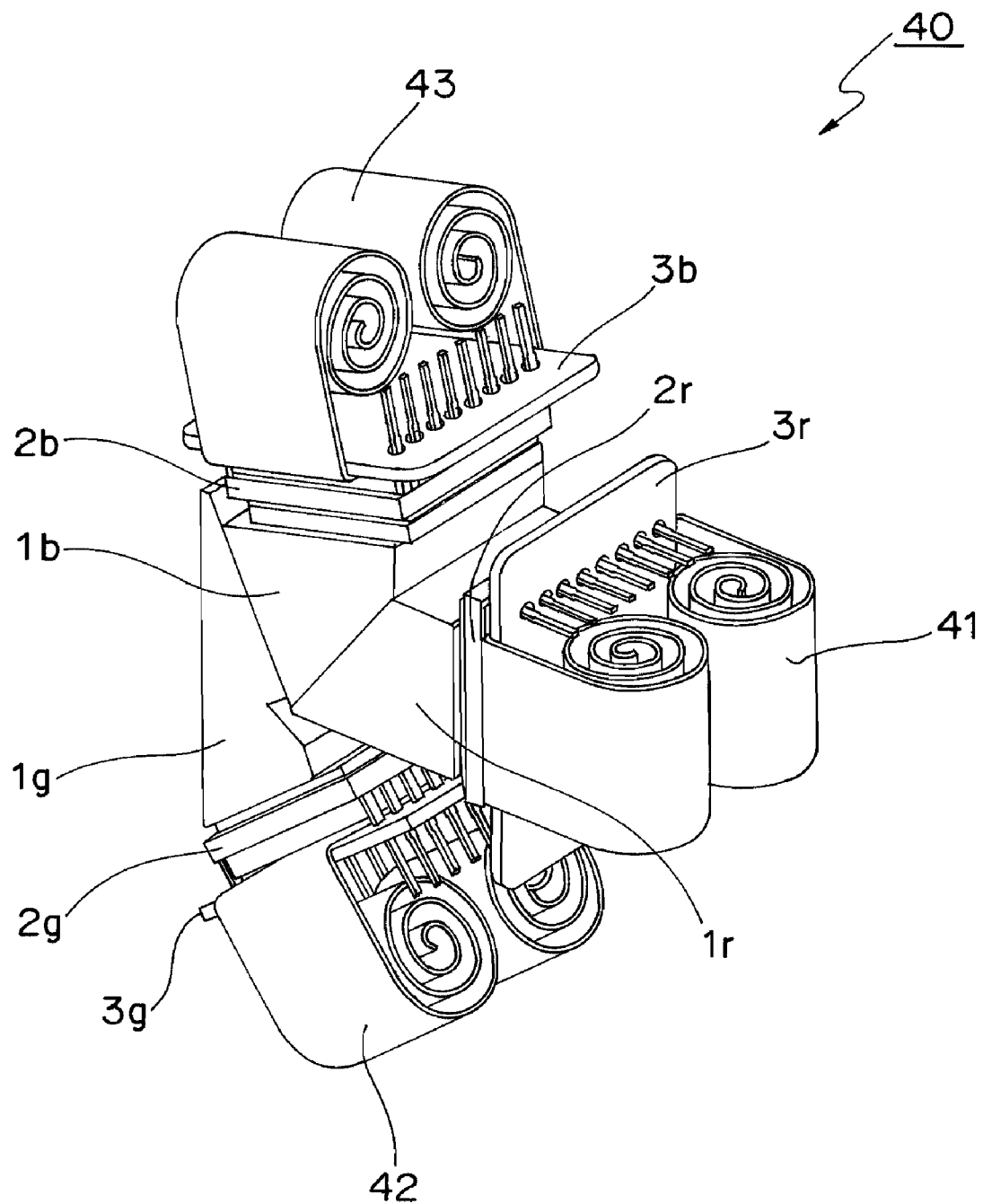
FIG. 6 is a schematic perspective view of an image pickup block equipped with a heat radiating structure for solid-state image sensors according to a second embodiment of the invention.
Figure 7:
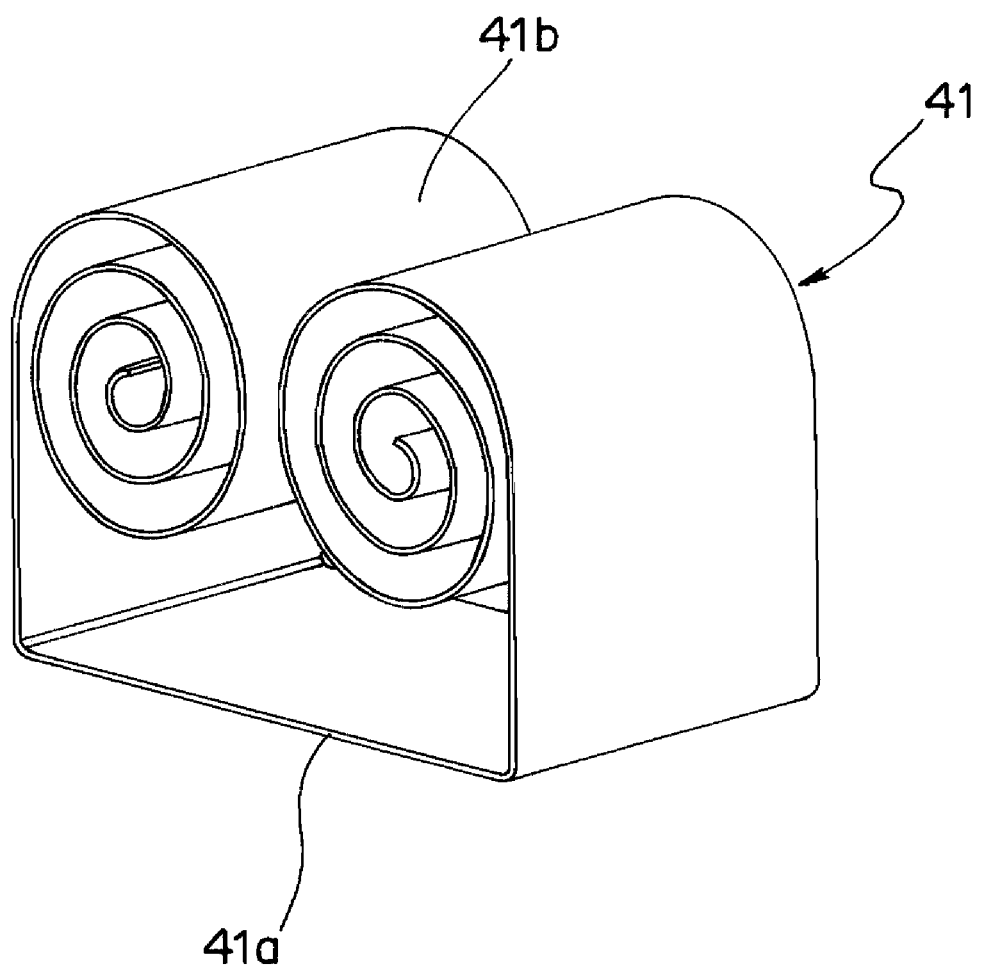
FIG. 7 is a schematic perspective view of a heat radiating member of the second embodiment.

The present invention is not limited to the above embodiment only, and may be carried out in other various embodiments. As an example, FIG. 6 shows a schematic perspective view of an image pickup block 40 equipped with a heat radiating structure for solid-state image sensors according to a second embodiment of the invention. Also, FIG. 7 shows a schematic perspective view of a heat radiating member 41 that typifies heat radiating members 41, 42, 43 provided on the image pickup block 40 of FIG. 6. It is noted that the image pickup block 40 is similar in structure itself to the image pickup block 20 of the first embodiment, and so like component members are designated by like reference numerals and their description is omitted.

As shown in FIGS. 6 and 7, although the heat radiating members 41, 42, 43 of the second embodiment are placed so as to be in contact with back faces of the solid-state image sensors 2r, 2g, 2b, respectively and independently, as in the case of the heat radiating structure of the first embodiment, yet the form of heat radiating portions in the heat radiating members 41, 42, 43 differs from that of the heat radiating portions of the first embodiment.

More specifically, the heat radiating portion 11b of the heat radiating member 11 in the first embodiment has a plural fin-like form of a generally accordion-folded-like shape. By contrast, a heat radiating member 41b of the heat radiating member 41 in the second embodiment shown in FIG. 7 has a fin-like shape that foil members each having a specified width size are curled into a spiral shape in their thicknesswise direction. Foil members extending upward, as viewed in the figure, are curled in mutually different directions from mutually opposing end portions of a contact portion 41a of the heat radiating member 41, respectively, by which the spirally shaped heat radiating member 41b is formed.

The heat radiating members 41, 42, 43 each having such a spiral form as shown above have not only a heat radiation characteristic similar to that of the heat radiating members 11, 12, 13 of the first embodiment, but also an advantage that the foil members, which can be manufactured by curling both end portions of the foil members, are relatively easy to manufacture.

Figure 8:
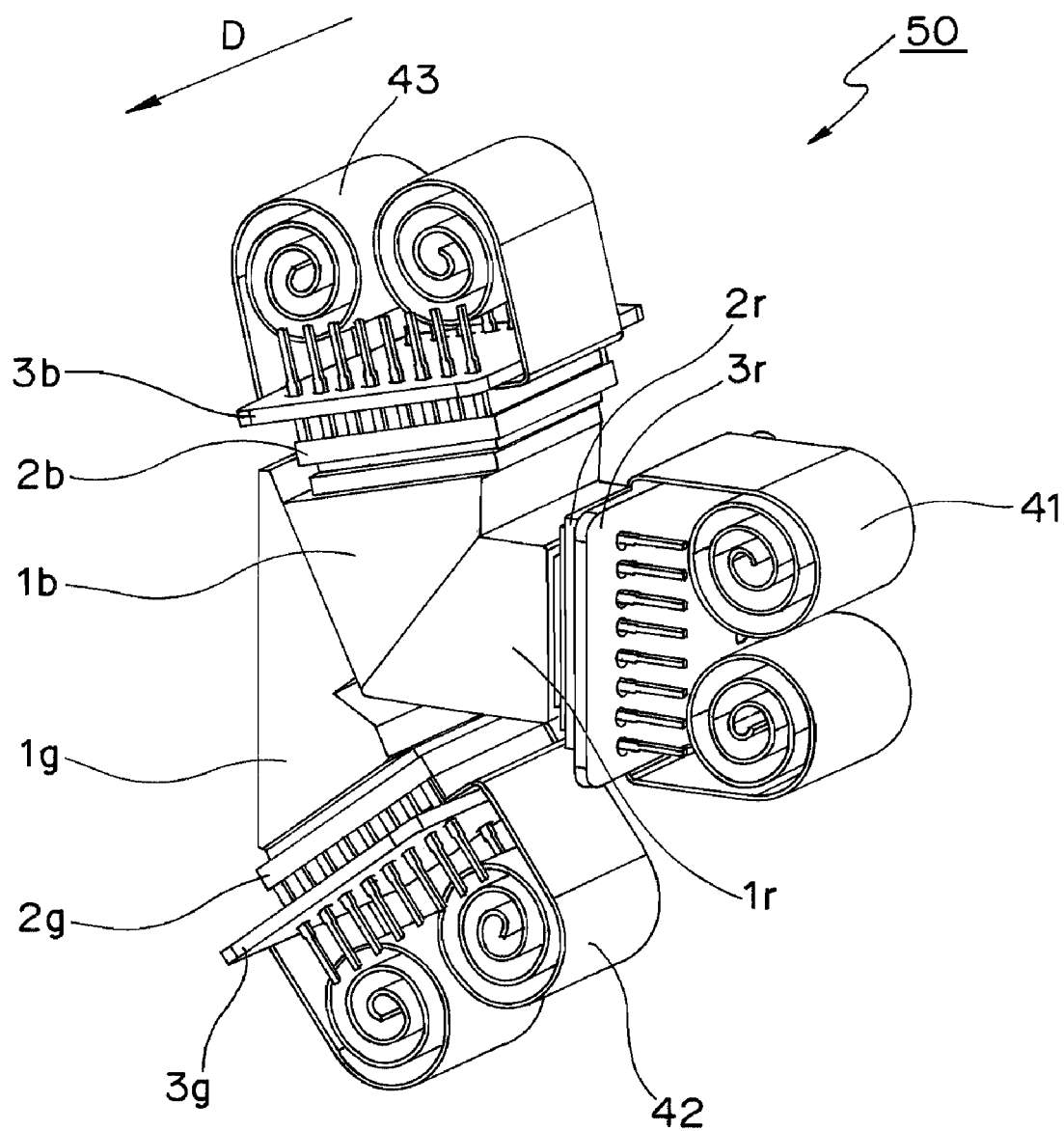
FIG. 8 is a schematic perspective view of an image pickup block equipped with a heat radiating structure according to a modification of the second embodiment.

Also, as in the case of the heat radiating structure according to one modification of the first embodiment, such spiral-shaped heat radiating members 41, 42, 43 as shown above can be provided on an image pickup block 50 so as to have the same gas flow direction D, as shown in FIG. 8.

Furthermore, the foregoing individual embodiments have been described about a generally accordion-folded-like form and a spiral-shaped form as an example of the form of the heat radiating members. However, without limitations only to such forms, other various forms may also be adopted only if the foil members are formed into such a form free from contact with members other than the solid-state image sensors (other heat radiating members, casing, etc.) that necessary heat radiating efficiency can be obtained.

Third Embodiment

The first and second embodiments have been described on the heat radiating structures in which three heat radiating members are so placed as to be in contact with three solid-state image sensors, individually, without interfering one another. However, the heat radiating structure of the invention is not limited to such structures only. Alternatively, as an example, a heat radiating member in which heat radiating members are coupled to one another is described in the following embodiment.

Figure 9:
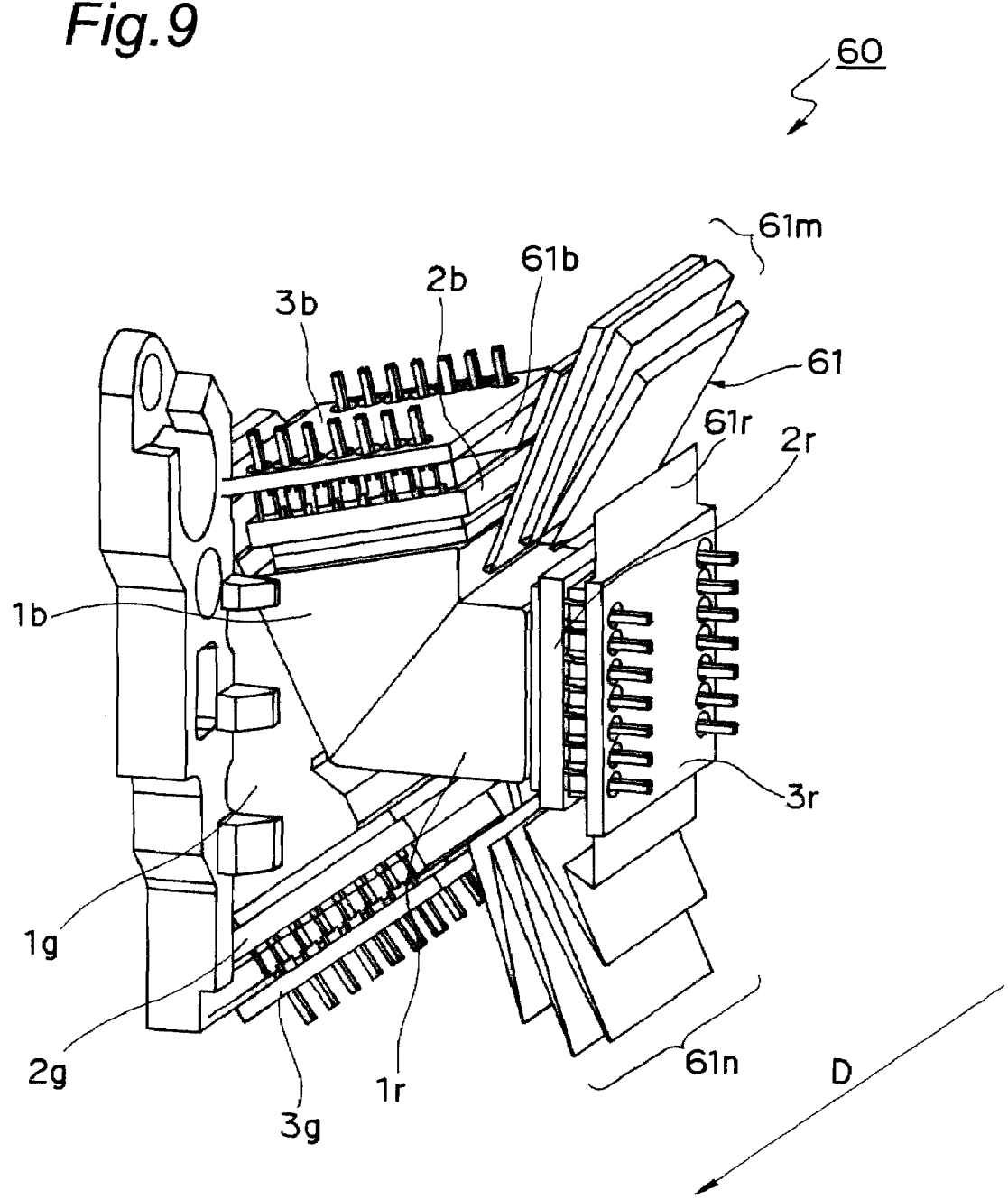
FIG. 9 is a schematic perspective view of an image pickup block equipped with a heat radiating structure for solid-state image sensors according to a third embodiment of the invention.

First, FIG. 9 shows a schematic perspective view of an image pickup block 60 equipped with a heat radiating structure for solid-state image sensors according to a third embodiment of the invention. It is noted that the image pickup block 60 is similar in structure itself except the heat radiating structure to the image pickup block 10 shown in FIG. 1, and so like component members are designated by like reference numerals and their description is omitted.

As shown in FIG. 9, the heat radiating structure for solid-state image sensors according to the third embodiment is a structure in which a heat radiating member 61 implemented by a foil member formed of a high heat conductivity material and folded a plurality of times is so placed as to be in contact with back faces of the solid-state image sensors 2r, 2g, 2b, respectively. Heat generated in the solid-state image sensors 2r, 2g, 2b is released into their surrounding gas, i.e. atmospheric air, through the heat radiating member 61 without interposition of any other member. As a result, temperatures of the individual solid-state image sensors 2r, 2g, 2b can be decreased.

Figure 10:
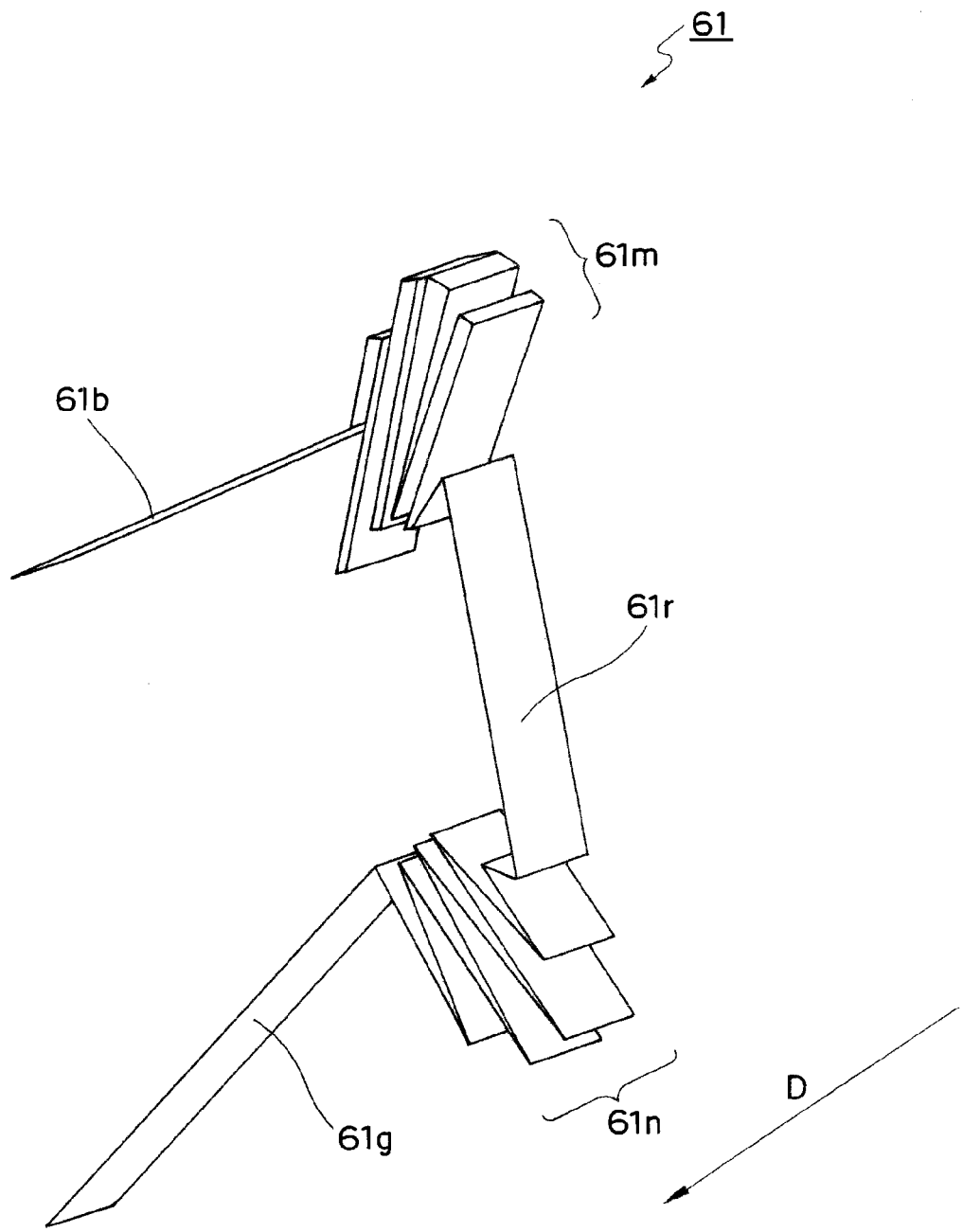
FIG. 10 is a schematic perspective view of a heat radiating member of the third embodiment.

FIG. 10 shows a schematic perspective view of an external structure of the heat radiating member 61 folded a plurality of times.

As shown in FIG. 10, the heat radiating member 61 includes contact portions 61r, 61g, 61b, (equivalent to any one of the first, second and third contact portions) which, when in contact with the back faces (faces of the solid-state image sensors opposite to their light-receiving faces for light beams) of the solid-state image sensors 2r, 2g, 2b (equivalent to any one of the first, second and third solid-state image sensors), transfer heat generated in the solid-state image sensors 2r, 2g, 2b to the heat radiating member 61 by the contact. Further, the heat radiating member 61 has heat radiating portions 61m, 61n which are bent portions formed by folding a plurality of times a foil member placed between mutually adjoining solid-state image sensors 2r, 2g, 2b so as to increase their contact area with the ambient atmosphere (e.g., air), i.e. the heat radiating area.

In this heat radiating member 61, the heat radiating portions 61m, 61n are formed so as to be placed between their corresponding ones of the contact portions 61r, 61g, 61b, respectively, in one continued unit by using a foil member having a specified width. For such a foil member, for example, copper or graphite sheet or the like is used as a high heat conductivity material (a material having a high thermal conductivity), and formed into a foil shape having a thickness of, for example, 0.1 mm or less.

In the heat radiating member 61 having such a structure as described above, as shown in FIG. 9, the contact portions 61r, 61g, 61b formed from the foil member are placed between their corresponding ones of the solid-state image sensors 2r, 2g, 2b and image sensor boards 3r, 3g, 3b, in which placement the contact portions 61r, 61g, 61b are set in contact with the back faces of the solid-state image sensors 2r, 2g, 2b, respectively. In this connection, dimensions (length and width) of the contact portions 61r, 61g, 61b are so determined that the contact portions 61r, 61g, 61b are brought into contact with generally entire flat portions of the back faces of the solid-state image sensors 2r, 2g, 2b, respectively, in order to ensure enough contact areas to allow the heat generated in the solid-state image sensors 2r, 2g, 2b to escape effectively. Also, to enhance substantial contactability between the contact portions 61r, 61g, 61b of the heat radiating member 61 and the back faces of the solid-state image sensors 2r, 2g, 2b, respectively, for example, grease or the like may be applied and placed to therebetween as a contact aid material.

Also, the contact portions 61r, 61g, 61b of the heat radiating member 61 are placed between the solid-state image sensors 2r, 2g, 2b and their corresponding ones of the image sensor boards 3r, 3g, 3b, respectively, and lightly sandwiched therebetween, so that the heat radiating member 61 is held in its placement position. Instead, without being sandwiched by the two members, the heat radiating member 61 may be provided slidably movable to some degree of freedom while held contactable with the solid-state image sensors 2r, 2g, 2b, respectively. That is, as far as the contactability between the solid-state image sensors and the heat radiating member is kept, relative movement of the heat radiating member to the solid-state image sensors does not matter.

Further, as shown in FIG. 9, in the state that the heat radiating member 61 is mounted on the image pickup block 60, the heat radiating member 61 is so placed as to be kept from contact with any other member such as other heat radiating member, casing, and lens barrel casing.

The heat radiating structure for solid-state image sensors according to the third embodiment adopts an arrangement in which the heat radiating member 61 is so placed as to be in contact with the back faces of the solid-state image sensors 2r, 2g, 2b which are fixed to the prism members 1r, 1g, 1b, respectively, constituting the image pickup block 60, so that the heat radiating portions 61m, 61n of the heat radiating member 61 folded a plurality of times serve to radiate heat into their ambient atmosphere. With such an arrangement, stress loads to be applied from the heat radiating member to the solid-state image sensors due to springbacks caused by thermal expansion and thermal contraction can be reduced remarkably, as compared to cases where heat radiating members are fixed to other members even in radiation-side end portions as in conventional heat radiating structures.

Further, by the makeup that the entire structure of the heat radiating member 61 having a plurally folded form and including their contact portions 61*r*, 61*g*, 61*b* and the heat radiating portions 61*m*, 61*n* is made up from a foil member formed of a high heat conductivity material having a thickness of 0.1 mm or less (e.g., made up in one integral unit), the own weight of the heat radiating member 61 can be reduced to a large extent. By the use of the heat radiating member whose own weight is reduced to a large extent as shown above, stress loads to be applied to the solid-state image sensors due to its own weight can be greatly reduced. Such a heat radiating member 61, being formed so as to be folded a plurality of times, can be folded compact, having an advantage of being easy to handle as a single component unit.

Further, by the provision of the portions (heat radiating portions) 61*m*, 61*n* that are folded a plurality of times and located between their corresponding ones of the solid-state image sensors 2*r*, 2*b*, 2*g*, the rigidity can structurally be lowered in a direction perpendicular to the widthwise direction of the folded portions (folding vertex portions), i.e., in a longitudinal direction of the heat radiating member 61 perpendicular to its widthwise direction. As a result, the stress loads applied to the solid-state image sensors are relaxed at the folded portions (bent portions) of the heat radiating portion.

Further, in this structure, widthwise directions of the individual folded portions of the heat radiating portion 61*m* and widthwise directions of the individual folded portions of the heat radiating portion 61*n* in the heat radiating member 61 are all coincident with the direction D, as shown in FIGS. 9 and 10. By the adoption of such a structure, the heat radiating efficiency can be improved by positively utilizing the convection of surrounding air, for example, by placing the image pickup block 60 so that the direction D is a vertical direction. In video cameras or the like on which the image pickup block 60 is mounted, such a heat radiating effect can effectively be obtained by designing the mounting posture of the image pickup block 60 so that the direction D becomes a vertical direction in the normal image pickup posture. Besides, even in cases where the direction of an air flow by natural convection and the widthwise directions of the individual folded portions of the heat radiating portions 61*m*, 61*n* are not coincident with one another, the heat radiating efficiency can be improved by mechanically forming an air flow along the direction D with a blower or the like.

Thus, there can be provided a heat radiating structure for solid-state image sensors which is capable of reducing stress loads applied to the solid-state image sensors through the heat radiating member while ensuring necessary heat radiating performance with a relatively simple structure so that deteriorations of the registration accuracy can be suppressed.

Fourth Embodiment

Figure 11:
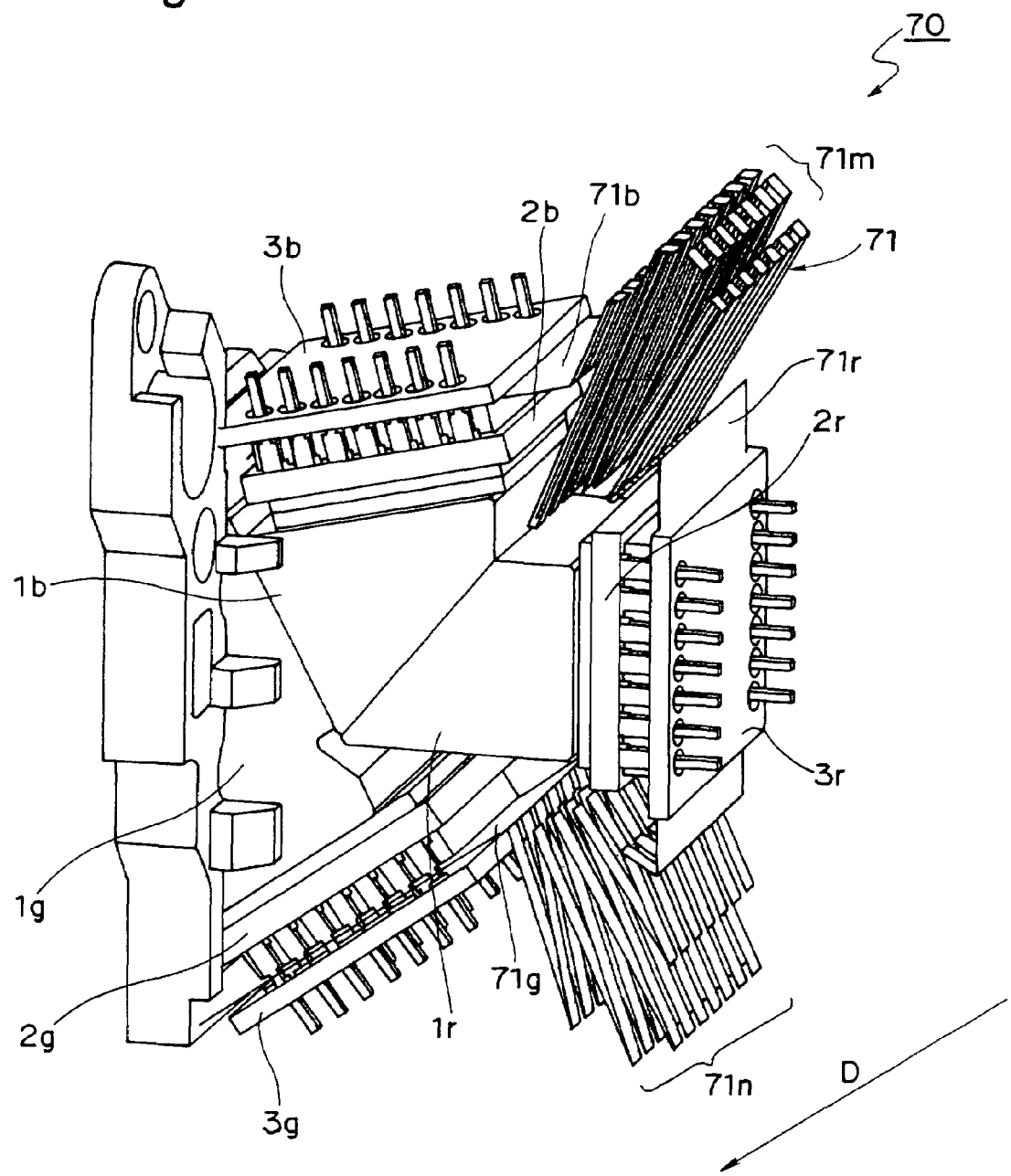
FIG. 11 is a schematic perspective view of an image pickup block equipped with a heat radiating structure for solid-state image sensors according to a fourth embodiment of the invention.
Figure 12:
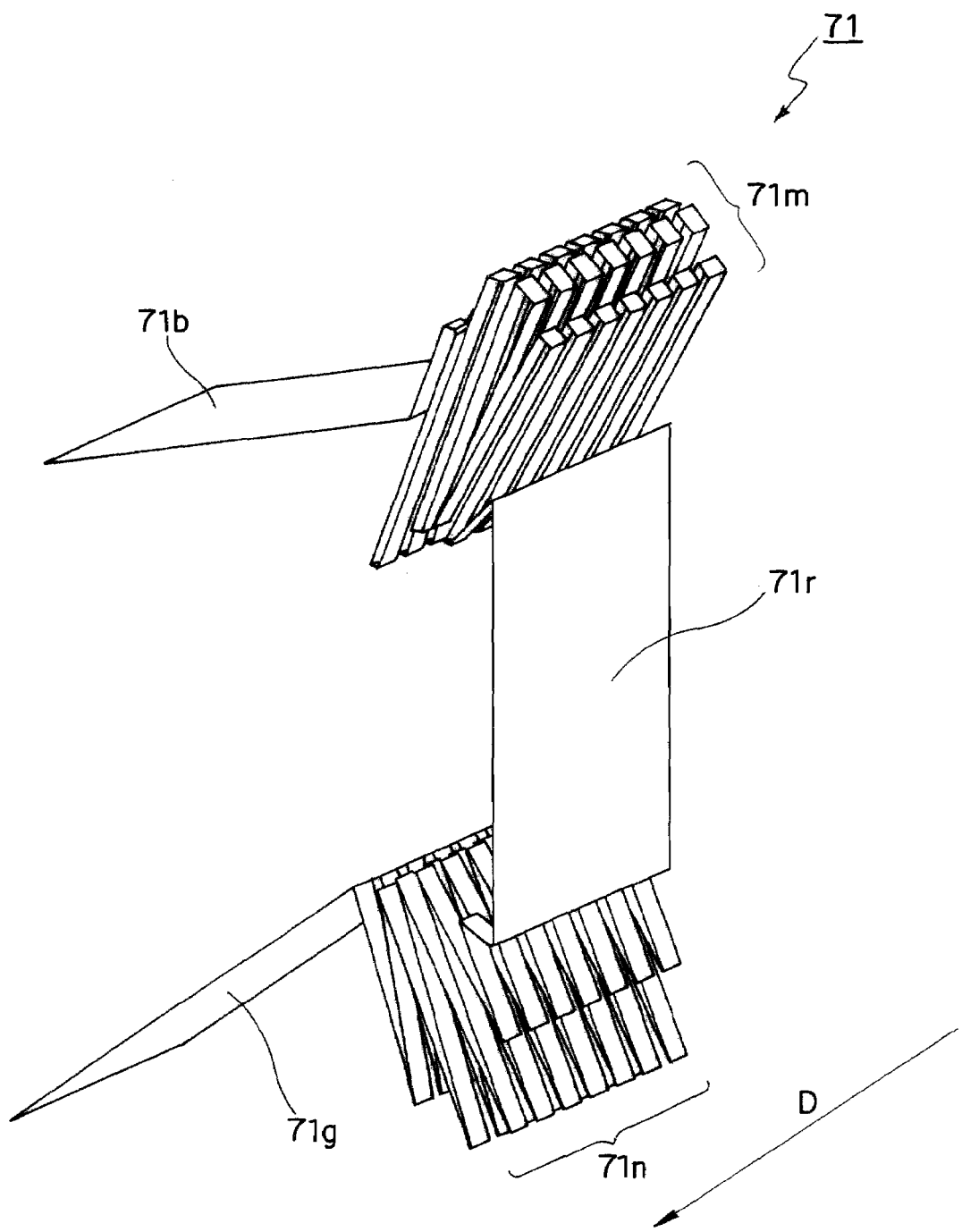
FIG. 12 is a schematic perspective view of a heat radiating member of the fourth embodiment.

Next, FIG. 11 shows a schematic perspective view of an image pickup block 70 equipped with a heat radiating structure for solid-state image sensors according to a fourth embodiment of the invention. Also, FIG. 12 shows a schematic perspective view of a heat radiating member 71 provided on the image pickup block 70 of FIG. 11. It is noted that the image pickup block 70 is similar in structure except the heat radiating member 71 to the image pickup block 10 of FIG. 1, and so like component members are designated by like reference numerals and their description is omitted.

As shown in FIGS. 11 and 12, the heat radiating member 71 of this fourth embodiment is so placed as to be in contact with the back faces of the solid-state image sensors 2*r*, 2*g*, 2*b*, respectively, as in the heat radiating structure of the third embodiment. However, the form of heat radiating portions of the heat radiating member 71 differs from that of the heat radiating portions of the third embodiment.

More specifically, whereas the heat radiating portions 61*m*, 61*n* of the heat radiating member 61 in the third embodiment are so formed that a foil member is folded a plurality of times, the heat radiating portions 71*m*, 71*n* of the heat radiating member 71 in the fourth embodiment shown in FIG. 12 are so formed that a foil member having a specified width is folded a plurality of times and moreover has a plurality of cutout portions formed along a direction perpendicular to its widthwise direction.

As shown in FIG. 12, the cutout portions in the heat radiating member 71 are so formed as to be parallel to heat flow directions (heat flux directions), respectively, which are directed from one end portion of the foil member toward the other end portion (directions perpendicular to the widthwise direction of the heat radiating member 71, i.e., its longitudinal direction). That is, a plurality of cutout portions are formed along the longitudinal direction of the heat radiating member 71.

It is when loads (stress loads) are applied along shearing directions of bonding surfaces between the solid-state image sensors 2*r*, 2*g*, 2*b* and the prism members 1*r*, 1*g*, 1*b* that deteriorations of the registration accuracy, which is an issue of the invention, do matter. Such loads in the directions in which the bonding surfaces are sheared are applied along the longitudinal direction and widthwise direction of the heat radiating member 71 due to its thermal expansion or thermal contraction. However, since the heat radiating member 71 has folded portions formed in its longitudinal direction, loads in the longitudinal direction are more easily absorbed while loads in the widthwise direction, conversely being less easily absorbed, matter. The widthwise loads in the shearing direction are proportional to the cube of the width of the heat radiating member 71, so that providing a plurality of cutout portions along directions perpendicular to the widthwise direction allows the loads in the shearing direction to be reduced. For instance, when the heat radiating member 71 is provided with nine cutout portions so as to be divided widthwise into ten portions, the shearing stress can be reduced to about one hundredth or so, as compared with cases in which no cutout portions are provided.

Since such cutout portions are formed parallel to a direction (longitudinal direction) perpendicular to the widthwise direction of the heat radiating member 71, i.e., to the heat flow direction, heat transferred from the solid-state image sensors 2*r*, 2*g*, 2*b* through the heat radiating member 71 flows along directions parallel to the cutout portions, so that the heat flow is never obstructed. Accordingly, the resulting heat transfer quantity is substantially equivalent to that of cases in which no cutout portions are formed, hence almost no occurrence of deterioration of the heat radiating characteristic of the heat radiating member 71 due to the formation of the cutout portions.

Thus, according to the heat radiating structure for solid-state image sensors in the fourth embodiment, loads in the shearing direction, which would be a major cause of deterioration of the registration accuracy, especially shearing stress loads occurring in the widthwise direction of the heat radiating member 71, can be reduced by the formation of a plurality of cutout portions substantially without causing any deterioration of the heat radiating characteristic, as compared with conventional heat radiating structures. Also, such a heat radiating structure can be realized by forming a plurality of cutout portions in the heat radiating portions of the foil-formed heat radiating member 71, thereby making the structure simple, making any complicated adjustment components and adjustment processes unnecessary, and making the structure easier to handle.

The above description has been given on an example of the structure in which cutout portions are formed in the heat radiating portions of the heat radiating member 71. However, such cutout portions may be a plurality of slits each having a width of, for example, about 0.1 mm, in which case similar effects can also be obtained. That is, the cutout portions of the fourth embodiment, which are provided to divide the heat radiating member 71 into a plurality of divisions along a direction perpendicular to its widthwise direction, may be either cutout portions each not having a width or cutout portions (slits) each having a width only if the division can be achieved. Further, these cutout portions do not necessarily need to be formed at equal intervals, and the number of cutout portions to be formed is preferably determined in consideration of the loads to be reduced or the strength of the heat radiating member 71 or the like.

Also, the above description has been given on a case in which the cutout portions are formed in the individual heat radiating portions provided between the solid-state image sensors 2r, 2g, 2b, respectively. Instead, cutout portions may also be formed only in heat radiating portions provided between particular solid-state image sensors. For example, in a structure in which a solid-state image sensor serves as a reference image sensor among three solid-state image sensors (i.e., a reference for adjustment of optical characteristics), cutout portions may be provided for only a heat radiating portion placed between the reference image sensor and a solid-state image sensor adjacent to the reference image sensor, and not for the other heat radiating portions. More specifically, when the solid-state image sensor 2g serves as the reference image sensor, it is the solid-state image sensor 2r that is adjacent to the solid-state image sensor 2g. In this case, cutout portions are formed in the heat radiating portion 71n placed between the solid-state image sensor 2g and the solid-state image sensor 2r, while cutout portions are not formed in the heat radiating portion 71m. Also, when the solid-state image sensor 2b serves as the reference image sensor, cutout portions are formed in the heat radiating portion 71m placed between the solid-state image sensor 2b and the solid-state image sensor 2r, while cutout portions are not formed in the heat radiating portion 71n.

The heat radiating member 71, allowed to have a plurality of forms of cutouts, has not only a heat radiating characteristic similar to that of the heat radiating member 61 of the third embodiment but also an advantage that the heat radiating member can be manufactured by forming cutouts in the heat radiating portions, thus being relatively easier to manufacture.

Further, even in the structure of the heat radiating member 71 allowed to have a plurality of forms of cutout portions as shown above, widthwise directions of the individual folded portions of the heat radiating portion 71m and widthwise directions of the individual folded portions of the heat radiating portion 71n are all coincident with the direction D, as shown in FIGS. 11 and 12, like the case of the heat radiating structure of the third embodiment. Thus, the heat radiating structure can be provided on the image pickup block 70 so that gas flow directions D are coincident with one another.

Further, the above description of the embodiments has been made on a case in which the heat radiating portions 61m, 61n or 71m, 71n are so formed as to be folded a plurality of times. However, those heat radiating portions may be formed so as to be not folded but bent or curved. In this case also, the contact area of the heat radiating member with its ambient atmosphere, i.e. the heat radiating area, can be increased by bending the foil member and not folding it a plurality of times, as in the case of the shape of being folded a plurality of times.

The foregoing individual embodiments have been described on the modes in which the heat radiating member is so formed as to be folded a plurality of times or bent, as well as the modes in which cutout portions are additionally formed, by way of example. However, without being limited to such modes, other various modes may be adopted only if the foil member can be kept free from contact with any member other than the solid-state image sensors (other heat radiating members, casing and the like) so that necessary heat radiating efficiency can be obtained.

The heat radiating structure for solid-state image sensors according to the present invention as well as solid-state image pickup devices having such a heat radiating structure produce an effect for reducing stress loads applied to the solid-state image sensors through the heat radiating member while ensuring necessary heat radiating performance with a relatively simple structure. Thus, the heat radiating structure as well as the solid-state image pickup devices are useful as a heat radiating structure for solid-state image sensors to be used for image pickup devices equipped with solid-state image sensors for use in television cameras, video cameras and the like, as well as, as solid-state image pickup devices having such a heat radiating structure or the like.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Applications No. 2007-30212 filed on Feb. 9, 2007 and No. 2007-206496 filed on Aug. 8, 2007, including specification, claims, and drawings are incorporated herein by reference in its entirety.

What is claimed is:

1. A heat radiating structure for solid-state image sensors, comprising:
a heat radiating member which has a contact portion to be put into contact with a solid-state image sensor fixed to a prism member, and a fin-like heat radiating portion for radiating heat into surrounding gas, the heat being transferred through the contact portion,
wherein the contact portion and the heat radiating portion are formed from a foil member made of a high heat conductivity material.

2. The heat radiating structure for solid-state image sensors as defined in claim 1, wherein the contact portion of the heat radiating member is put into contact with the solid-state image sensor via a contact aid material.

3. The heat radiating structure for solid-state image sensors as defined in claim 1, wherein in the heat radiating member, the fin-like heat radiating portion is so shaped that the foil member is bent or folded in its thicknesswise direction.

4. The heat radiating structure for solid-state image sensors as defined in claim 1, wherein a plurality of the heat radiating members are in contact with a plurality of the solid-state image sensors, respectively and independently, which are fixed to a plurality of the prism members constituting a color separation prism for separating light into a plurality of color components.

5. The heat radiating structure for solid-state image sensors as defined in claim 4, wherein widthwise directions of the heat radiating members in the fin-like heat radiating portions are set along an identical direction among all the heat radiating members.

6. The heat radiating structure for solid-state image sensors as defined in claim 1, wherein the contact portion is placed so as to be in contact with a substantially entire surface of one face of the solid-state image sensor, and the fin-like heat radiating portion is formed from the foil member extending from mutually opposing end portions of the contact portion, respectively.

7. The heat radiating structure for solid-state image sensors as defined in claim 1, wherein
the heat radiating member comprises first and second ones of the contact portions which are fixed to a plurality of the prism members, respectively and independently, and which are put into contact with mutually adjoining first and second ones of the solid-state image sensors, respectively and independently, and the heat radiating portion for radiating heat into surrounding gas, the heat being transferred through the first and second contact portions, wherein
the heat radiating portion is placed between the first and second contact portions,
the respective first and second contact portions and the heat radiating portion are formed by the foil member in continuation, respectively, and
the heat radiating portion has such a fin-like shape that the foil member is folded or bent a plurality of times.

8. The heat radiating structure for solid-state image sensors as defined in claim 7, the heat radiating member further comprising:
a third contact portion which is to be put into contact with a third solid-state image sensor mutually adjoining the second solid-state image sensor; and
another heat radiating portion placed between the second and third contact portions, for radiating heat into surrounding gas, the heat being transferred through the second and third contact portions, wherein
the respective second and third contact portions and the another heat radiating portion are formed from a single-in-continuation foil member made of a high heat conductivity material.

9. The heat radiating structure for solid-state image sensors as defined in claim 7, wherein in the heat radiating portion, a plurality of cutout portions are formed along a direction perpendicular to a widthwise direction of the heat radiating member.

10. The heat radiating structure for solid-state image sensors as defined in claim 9, wherein the cutout portions are slits each having a width.

11. A solid-state image pickup device comprising:
a color separation prism made up of a plurality of prism members, for separating light into a plurality of color components;
a plurality of solid-state image sensors fixed to the plurality of prism members, respectively and independently; and
a plurality of heat radiating members having contact portions to be put into contact with the solid-state image sensors, respectively and independently, and fin-like heat radiating portions for radiating heat into surrounding gas, the heat being transferred through the contact portions,
wherein the contact portions and the heat radiating portions are formed from a foil member made of a high heat conductivity material.

12. The solid-state image pickup device as defined in claim 11, wherein widthwise directions of the heat radiating members in the fin-like heat radiating portions are set along an identical direction among all the heat radiating members.

13. A solid-state image pickup device comprising:
a prism member;
a solid-state image sensor fixed to the prism member; and
a heat radiating member which has a contact portion to be put into contact with the solid-state image sensor, and a fin-like heat radiating portion for radiating heat into its surrounding gas, the heat being transferred through the contact portion,
wherein the contact portion and the heat radiating portion are formed from a foil member made of a high heat conductivity material.

14. The solid-state image pickup device as defined in claim 13, wherein the contact portion of the heat radiating member is put into contact with the solid-state image sensor via a contact aid material.

15. The solid-state image pickup device as defined in claim 13, wherein in the heat radiating member, the fin-like heat radiating portion is so shaped that the foil member is bent or folded in its thicknesswise direction.

16. The solid-state image pickup device as defined in claim 13, wherein the contact portion is placed so as to be in contact with a substantially entire surface of one face of the solid-state image sensor, and the fin-like heat radiating portion is formed from the foil member extending from mutually opposing end portions of the contact portion, respectively.

17. The solid-state image pickup device as defined in claim 13, comprising:
a color separation prism made up of a plurality of the prism members, for separating light into a plurality of color components; and
a plurality of the solid-state image sensors fixed to the plurality of the prism members, respectively and independently, wherein
the heat radiating member has first and second ones of the contact portions which are put into contact with mutually adjoining first and second ones out of the plurality of solid-state image sensors, respectively and independently, and the heat radiating portion for radiating heat into surrounding gas, the heat being transferred through the first and second contact portions,
the heat radiating portion is placed between the first and second contact portions, and the respective first and second contact portions and the heat radiating portion are formed by the foil member in continuation, and
the heat radiating portion has such a fin-like shape that the foil member is folded or bent a plurality of times.

18. The solid-state image pickup device as defined in claim 17, the heat radiating member further comprising:
a third contact portion which is to be put into contact with a third solid-state image sensor mutually adjoining the second solid-state image sensor; and
another heat radiating portion placed between the second and first contact portions, for radiating heat into surrounding gas, the heat being transferred through the second and third contact portions, wherein the respective second and third contact portions and the another heat radiating portion are formed from a single-in-continuation foil member made of a high heat conductivity material.

19. The solid-state image pickup device as defined in claim 13, wherein in the heat radiating portion, a plurality of cutout portions are formed along a direction perpendicular to a widthwise direction of the heat radiating member.

20. The solid-state image pickup device as defined in claim 19, wherein the cutout portions are slits each having a width.

* * * * *